Oct. 1, 1957

C. W. THULIN 2,808,511

PULSE GENERATORS WITH PULSE SHAPING

Filed March 16, 1955

INVENTOR
C. W. THULIN

BY George C. Ford

ATTORNEY

United States Patent Office 2,808,511
Patented Oct. 1, 1957

2,808,511

PULSE GENERATORS WITH PULSE SHAPING

Charles W. Thulin, New Providence, N. J., assignor to Bell Telephone Laboratories, Incorporated, New York, N. Y., a corporation of New York Application March 16, 1955, Serial No. 494,744
10 Claims. (Cl. 250—36)

This invention relates to pulse generating circuits and more particularly to circuits for modulating or keying magnetrons with high energy pulses.

As is known, it is often advantageous to modulate a magnetron with very steep-sided pulses. Unfortunately, however, multimoding can occur when the rise time of the pulses is so short that there is not sufficient time for the tube to fire in the desired mode before the voltage has risen to such a value as to cause it to oscillate in a different mode.

Because of this there are applications in which it would be advantageous to increase the rise time of short magnetron keying pulses, that is to say, to reduce their leading-edge slope.

Obviously, this can be done by simply inserting enough impedance in series with the input circuit of the magnetron to suitably increase the charging time-constant of the stray shunt capacitance thereof. However, this will decrease the rate at which the energy of each keying pulse can be converted into R. F. energy and therefore it will increase the duration of the pulse as a whole rather than solely that of its leading edge. In addition, it will increase the losses of the circuit particularly if the added impedance is largely or entirely resistive. Likewise, while the rise time can easily be increased by inserting enough capacitance impedance in shunt in the input circuit to effect the required increase in its charging time-constant, this also is undesirable, in this case because capacitance loading of the magnetron while it is oscillating will deteriorate the envelopes of the output R. F. pulses by causing discriminatory attenuation of their highest frequency sidebands.

Accordingly, it is an object of this invention to controllably increase the rise time of magnetron modulating pulses having excessively steep leading edges without incurring such disadvantages as those mentioned above.

It is another object to increase the rise time without substantially increasing the durations of any other portions of the pulses.

In general, according to this invention the input circuit by which the magnetron, or any similar load device which is pulse energized, is connected to the pulse source employs a series or shunt network or both comprising: (1) a lumped impedance for increasing the charging time of the inherent shunt capacitance of the input circuit; and (2) a circuit element acting effectively as a switch for rapidly taking the lumped impedance out of circuit at the end of the corrected rise time of each pulse. If the added network is in series in the input circuit, the lumped impedance may be principally either inductive or resistive, whereas if it is in shunt the lumped impedance should be capacitive. Suitable elements for performing the switching function are a saturable core inductor for abruptly short-circuiting a lumped series impedance at the desired time, and a saturable capacitor for similarly open-circuiting a lumped shunt impedance.

Figure 1:
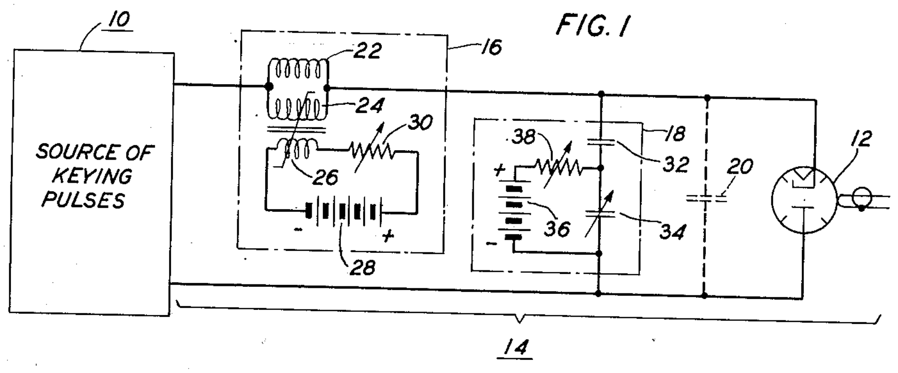
Fig. 1 is a schematic circuit diagram of apparatus embodying the present invention.

Fig. 1 shows a source of keying pulses 10 connected to a magnetron 12 over an input circuit 14. The circuit 14 comprises series and shunt networks 16, 18 to increase the charging time of its total stray capacitance 20, e. g., its distributed lead capacitance plus the interelectrode capacitance of the magnetron, to the extent required for suitably increasing the rise time of the energizing pulses developed across the magnetron.

The network 16 comprises two parallel-connected elements, a linear inductor 22 and a non-linear saturable core inductor or "pulsactor" 24. As is known (see Proceedings of Institution of Electrical Engineers, May 1951, part III, No. 53, page 185) a pulsactor is an inductor having a special core which saturates very abruptly, after an interval during which it is being initially magnetized, and in so doing sustains a very great reduction in permeability. As a result, the drop in a pulsactor's inductance produced when its core saturates is so sudden and great, e. g., in less than .01 microsecond a 99.99% drop therein may occur, that it can be used in certain applications as a normally-open, precisely-delayed-action, automatic switch. Thus the pulsactor 24 is used herein to abruptly eliminate substantially all of the series impedance of the network 16 at exactly the desired time by effectively losing substantially all of its own inductance as a result of which it effectively short-circuits inductor 22. Since conventional pulsactors which provide suitable delays when subjected to the kind of pulses produced by the source 10, invariably have excessively large values of unsaturated inductance for present purposes, the pulsactor 24 is chosen primarily simply to provide the desired delayed switching function. The parallel-connected inductor 22 of lower value is relied on to provide the desired series inductance which will be of a value determined by inductor 22 and the unsaturated inductance of the pulsactor 24 in parallel. The delay should be slightly longer than the desired rise time. Although the magnetron will start to oscillate while the pulsactor is going through the interval of change-over from its unsaturated to its saturated state, fortunately this is not important since this interval is short enough to occupy only a small fraction of the first part of the R. F. power pulse. Because of this the current drawn by the magnetron over most of the time that it is oscillating, and in particular over all of a large terminal portion of the power pulse, will be free of amplitude modulation due to transitional variations produced in the pulsactor's inductance as it goes through the process of saturating. In this connection it is to be noted that the quickness of the change-over is aided by the fact that the current through the network 16 increases very greatly when the magnetron fires.

As noted above, conventional pulsactors having appropriate delays for present purposes invariably have excessively large values of unsaturated inductance. In fact, it has been found that if a pulsactor alone is used the effect is usually merely to delay the formation of any pulse. It is only after the pulsactor has saturated that any pulse is formed. Then, of course, effective inductance in circuit is so low that there is not substantial reduction in the build up of the pulse. One way in which this difficulty can be overcome without using an additional element such as the inductor 22 or an equivalent resistor is to modify the pulsactor by introducing an appropriate small air gap in its core, to suitably reduce its unsaturated inductance. However, this expedient has certain disadvantages, for example, that the gap size is very critical, and the effect of the air gap is to intolerably increase the duration of the change-over interval. Because of the latter effect the amplitude modulation of the R. F. power pulse by transitional changes in inductance during the change-over may extend over too large a part of the pulse. Moreover, it may not be feasible to materially reduce the last-mentioned effect by designing the pulsactor to start its change-over before the magnetron fires since this will cause the reduction in slope to progressively diminish over the final portion of the leading edge where it is most needed.

The network 16 also comprises a resetting and/or biasing means for the pulsactor including a bias winding 26, a D.-C. source 28, and a current limiting resistor 30. The potential and polarity of the source 28 and the resistance of the resistor 30 are chosen so that the magnetomotive force produced by the winding 26 will: (1) oppose that produced by the main pulsactor winding during each transmission of a keying pulse over the circuit 14 whereby it will reset the pulsactor during the interpulse intervals; and (2) establish any desired magnetic bias of the pulsactor core if biasing is to be relied on in controlling the duration of the time delay provided by the pulsactor.

The network 18 comprises two series connected elements, a capacitor 32 and a saturable capacitor 34. As disclosed in U. S. Patent 2,689,311 a saturable capacitor comprises a special kind of dielectric which saturates very abruptly after a period of delay during which it is initially electrostatically polarized by the charging up of its capacitance and which upon saturation undergoes a very great downward change in the value of its dielectric constant. Because of this characteristic, the capacitor 34 may be employed as a normally-closed, precisely-delayed-action, automatic switch, it being thus employed herein to effectively take the capacitive impedance of the network 18 out of the circuit 14 immediately after the end of the desired rise time of each voltage pulse developed across the magnetron during each keying thereof. The capacitor 34 is chosen as one which will start to saturate, at the end of the desired rise time, just after the magnetron fires, and the capacitor 32 is chosen so that the network 18 will have the correct initial capacitance, in accordance with the other parameters of the circuit 14, for increasing the rise time of the pulses as desired. As will be understood by those skilled in the art, the delay which is provided by the saturable capacitor will be a function of a number of parameters of the pulser, as well as its own parameters, and also of the operating conditions of the pulser, and therefore these factors should be considered in selecting or designing the saturable capacitor 34. Since the delay can also be affected by biasing, such expedients may be employed as shown at 36, 38 as a control thereof as well as for resetting.

Figure 2:
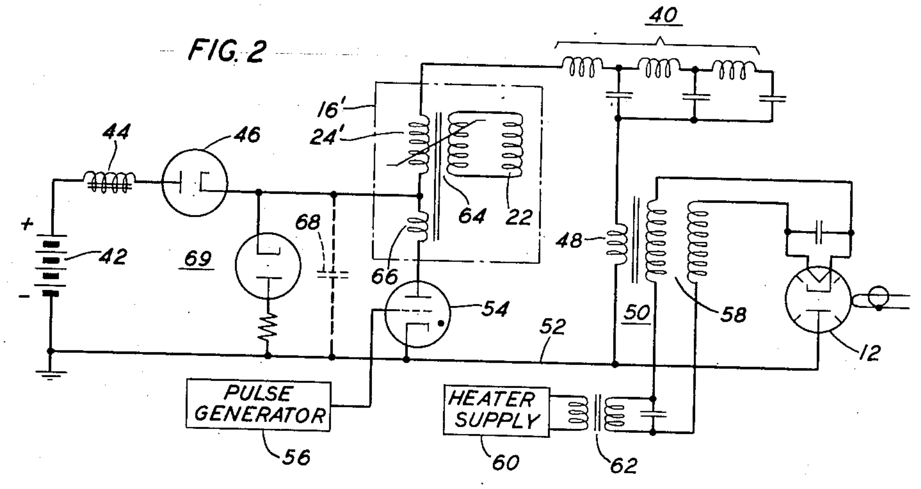
Fig. 2 is a schematic circuit diagram of another embodiment of the invention in a pulse modulator employing a hydrogen thyratron switch tube.

The magnetron pulser shown in Fig. 2 is entirely conventional except for its use of a padding series network (16') which, in this case, in addition to increasing the keying pulse rise time, reduces the rate of current-build-up in the hydrogen thyratron tube employed in the pulser. In its operation, a pulse-forming network 40 is resonance-charged with energy from a D.-C. source 42 in the intervals between keying pulses. This charging occurs over a path including an inductor 44, a diode 46 which prevents the network 40 from discharging back into the reactive components of its charging circuit, the pulsactor 24' of the network 16', the primary 48 of an impedance matching transformer 50, and a grounded return path 52. The network 40 is periodically abruptly discharged through the primary 48 by the switching action of a hydrogen thyratron 54 which is actuated by positive triggering pulses from a pulse generator 56. The resulting periodic impulses of current passing through the primary 48 cause very large amplitude keying pulses to be produced across the bifilar secondary 58 of the transformer and thereby to be applied across the magnetron 12. Cathode heater energy is fed to the magnetron in a conventional manner from a supply 60 over a transformer 62 and the windings of the secondary 58.

It is to be understood that padding networks can be used to modify a pulser as disclosed herein whether or not the pulser includes an impedance matching output transformer and, if it does, whether they are used on either its input or output side or both.

The network 16' differs from the network 16 of Fig. 1 in that: (1) the linear inductor is magnetically coupled to the pulsactor rather than directly connected across it. To this end the pulsactor (24') used is the primary of a saturable core transformer 64 across the secondary of which the linear inductor 22 is connected; and (2) a section, 66, of the pulsactor 24' is connected in the circuit at a point where it can limit the rate of current rise in the thyratron 54 due to the otherwise unlimited discharge through it, each time that it fires, of energy which is stored electrostatically in the stray capacitance 68 of circuitry on its input side.

The magnetic coupling of the inductor 22 across the pulsactor affords D.-C. isolation thereof making it possible to ground it and permits its selection from inductors having a wide range of values because of the possibility of transforming its impedance upwards or downwards as desired by the use of an appropriate transformer ratio. Of course, the primary section 66 could be eliminated by locating the network 16' in the circuit position in which the section 66 is connected in Fig. 2. If so located it would act to control both the voltage rise across the magnetron and current rise in the thyratron. However, the arrangement shown is preferred since the charging current which flows through the pulsactor 24' in the reverse direction after the generation of each keying pulse, affords simple and automatic resetting of its core. Obviously, this would not be so if the network were relocated in which case only unidirectional current flow is possible due to the presence of the thyratron tube 54. This pulser includes a diode 69 for damping out undesired surges which may be produced by unused energy which remains stored in the network 40 and other portions of the pulser after the termination of each keying pulse.

Figure 3:
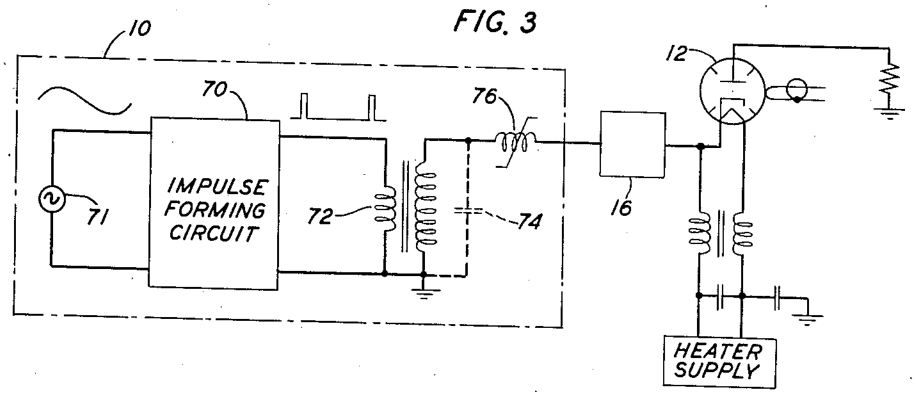
Fig. 3 is a schematic circuit diagram of another embodiment in which the modulator is A.-C. energized and of the so-called "series type."

Fig. 3 shows an embodiment of the invention wherein the source of keying pulses 10 comprises a series-type, A.-C. energized pulsing circuit of the kind disclosed in the co-pending application of Neitzert Serial No. 475,029, filed December 14, 1954. In this magnetron modulator a pulse forming circuit 70 converts the sinusoidal output from an A.-C. power source 71 into a low-duty-cycle train of uni-directional pulses and feeds them into a step-up transformer 72 having a predetermined amount of stray capacitance 74 on its secondary side. A pulsactor 76 which has a delay time substantially equal to the charging time of the capacitance 74 is connected in series between this capacitance and the magnetron to serve as a switch for causing a resonance discharge of the former into the latter at the instant when the maximum amount of energy is available for such transfer. The pulsactor 76 has so small a value of saturated inductance that the frequency of its resonance with the total circuit capacitance is very high with the result that this discharge occurs as a surge whose period is very much shorter than the duration of the impulses which the transformer 72 receives from the circuit 70. Therefore this is a kind of modulator which is capable of applying the very shortest of keying pulses to a magnetron and by the same token, of producing pulses with excessively short rise times. Accordingly, one or more padding networks, such as the network 16 of the type shown in Fig. 1 may be employed to advantage to increase the rise time as explained above without otherwise increasing the duration of the pulses. It is noted that this embodiment is structurally characterized by the use of two serially-connected pulsactors in series with the input to the magnetron and functionally by the use, in the final application of each pulse to the magnetron, of two distinct switching actions which are separated in time by only slightly more than the corrected rise time of the pulse.

What is claimed is:

1. Apparatus comprising a load device, a source of modulating pulses, a circuit coupling said source to said device, and a network in said circuit having a suitable value of padding impedance for increasing to a predetermined value the rise time of the energizing pulse developed across said device each time that one of said modulating pulses is applied thereto over said circuit, said network including, switching means for effectively taking most of said padding impedance out of said circuit at about the end of said rise time and in a much shorter switching interval than the duration of said energizing pulse.

2. Apparatus comprising a magnetron, a source of magnetron modulating pulses, a circuit coupling said source to said magnetron, and a network in said circuit having a suitable value of padding impedance for increasing to a predetermined value the rise time of the energizing pulse developed across the magnetron each time that one of said modulating pulses is applied thereto over said circuit, said network including, switching means for effectively taking most of said padding impedance out of said circuit at about the end of said rise time and in a much shorter switching interval than the duration of said energizing pulse.

3. Apparatus as in claim 2 in which said network is serially connected in said circuit and includes a pulsactor and an impedance coupled across the pulsactor.

4. Apparatus as in claim 2 in which said network is serially connected in said circuit and includes a pulsactor and means for magnetically biasing the core thereof.

5. Apparatus as in claim 4 in which said biasing means is adapted to bias said core to beyond saturation in the direction opposite to that in which it is magnetized during the application of each of said modulating pulses to the magnetron over said circuit.

6. Apparatus as in claim 2 in which said network comprises an element having a predetermined impedance value and a saturable-core transformer having a primary and a secondary, said primary being serially connected into said coupling circuit and said element being connected across said secondary.

7. A magnetron pulse modulator comprising a magnetron; a source of magnetron modulating pulses; a step-up transformer coupling said source to said magnetron and having a predetermined amount of shunt capacitance on its high impedance side; automatic switching means, such as a pulsactor, connected between the transformer and the magnetron for discharging said capacitance into the magnetron after each charging of the capacitance by the application of a pulse to it from said source over said transformer; and a network in the portion of said circuit between the switching means and the magnetron having a suitable value of padding impedance for increasing to a predetermined value the rise time of the energizing pulse developed across the magnetron each time that said capacitance is discharged thereinto over said switching means, said network including a second switching means, such as a saturable impedance device, for effectively taking most of said padding impedance out of said portion of said circuit at about the end of said rise time and in a much shorter switching interval than the duration of said energizing pulse.

8. A magnetron pulse modulator comprising a magnetron; a source of magnetron modulating pulses; a step-up transformer coupling said source to said magnetron and having a predetermined amount of shunt capacitance on its high impedance side; two pulsactors serially connected between the transformer and the magnetron; one of the pulsactors requiring sufficient time before its core becomes saturated during each application of a modulating pulse to the transformer to permit charging of said capacitance which results therefrom to reach substantially its maximum possible level, and the other pulsactor requiring a very much shorter interval for its core to become saturated.

9. Apparatus comprising electrical energy storage means, such as a delay-line type of pulse-forming network; a pulse transformer having a primary and a secondary; a source of potential; a charging circuit connecting said storage means to said source over said primary; a magnetron connected to said secondary; a discharge circuit; a gaseous discharge tube for periodically energizing the magnetron by discharging the storage means over said discharge circuit and through said primary; the discharge circuit including a waveform-correcting network providing therein a suitable value of series padding impedance for increasing to a predetermined value the rise time of the energizing pulses developed across the magnetron each time that said storage means is discharged through said primary, said network including a pulsactor having a winding which carries enough of each flow of discharge current to cause its core to be saturated and being adapted to thereby abruptly take most of the padding impedance out of said discharge circuit at about the end of said rise time; and said charging and discharging circuits having a common circuit portion which contains at least a portion of said winding so that said core is reset by the flow of charging current to the storage means in the interval after each discharge thereof.

10. Apparatus as in claim 9 in which energy stored in the stray capacitance of part of said charging circuit tends to discharge directly through said tube each time that it fires without passing through said common circuit portion or through said portion of said winding therein; and at least another portion of a winding of said pulsactor, such as another portion of said first-mentioned winding is suitably connected in series with said tube to limit to a predetermined value the rate of current build-up which occurs therein each time that it fires by limiting the rate of its discharge of said stray capacitance, both of said winding portions being magnetically coupled to said core to be similarly affected by saturations and resettings thereof.

References Cited in the file of this patent

UNITED STATES PATENTS

| | | |
|---|---|---|
| 2,416,718 | Shockley | Mar. 4, 1947 |
| 2,419,227 | Peterson | Apr. 22, 1947 |